United States Patent
Gong et al.

(10) Patent No.: US 9,389,364 B1
(45) Date of Patent: Jul. 12, 2016

(54) OPTICAL SPLITTER WITH ABSORPTIVE CORE AND REFLECTIVE GRATING

(71) Applicant: Futurewei Technologies, Inc., Plano, TX (US)

(72) Inventors: Jianmin Gong, Santa Clara, CA (US); Weiyang Wang, Shenzhen (CN); Cong Chen, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/622,421

(22) Filed: Feb. 13, 2015

(51) Int. Cl.
*H04B 10/00* (2013.01)
*G02B 6/293* (2006.01)
*H04B 10/27* (2013.01)
*H04J 14/00* (2006.01)

(52) U.S. Cl.
CPC ............ *G02B 6/29316* (2013.01); *H04B 10/27* (2013.01)

(58) Field of Classification Search
CPC ............ G02B 2006/1215; G02B 6/28; G02B 6/2808; G02B 6/2813; H04B 10/272
See application file for complete search history.

(56) References Cited

U.S. PATENT DOCUMENTS

| 5,991,314 A | 11/1999 | Ionov et al. |
|---|---|---|
| 2003/0053773 A1 | 3/2003 | Ainslie et al. |
| 2003/0063843 A1* | 4/2003 | Horne .................. H04J 3/0655 385/24 |
| 2003/0068129 A1 | 4/2003 | Bhagavatula et al. |

FOREIGN PATENT DOCUMENTS

| CN | 101022311 A | 8/2007 |
|---|---|---|
| CN | 101540468 A | 9/2009 |
| CN | 102684049 A | 9/2012 |
| CN | 103002359 A | 3/2013 |
| EP | 2690724 A2 | 1/2014 |

OTHER PUBLICATIONS

Foreign Communications From A Counterpart Application, PCT Application No. PCT/CN2016/073661, International Search Report dated Apr. 22, 2016, 8 pages.
Foreign Communication From A Counterpart Application, PCT Application No. PCT/CN2016/073661, Written Opinion dated Apr. 22, 2016, 4 pages.

* cited by examiner

*Primary Examiner* — Daniel Dobson
(74) *Attorney, Agent, or Firm* — Conley Rose, P.C.; Grant Rodolph; Jonathan K. Polk

(57) ABSTRACT

An optical splitter has a main branch coupled to a number of tributary branches. The main branch includes a light-absorptive core and a light-reflective grating. The absorptive core can absorb light arriving from the tributary branches and transmit light arriving from the main branch to the reflective grating. The reflective grating can reflect light from the main branch back through the absorptive core to the main branch. Light arriving from the tributary branches exchanges mode with light reflected by the reflective grating.

20 Claims, 5 Drawing Sheets

OPTICAL SPLITTER WITH ABSORPTIVE CORE AND REFLECTIVE GRATING

BACKGROUND

An optical network, such as a passive optical network (PON), includes a number of optical line terminals (OLTs) that are connected to a number of optical network units (ONUs) using optical fibers. For example, an OLT in a centralized location may be connected to multiple ONUs that are in different locations.

The optical fiber connected to an OLT is split into multiple tributary branches at an optical splitter, and each tributary branch is connected to a respective ONU. Optical signals (light) from the OLT are carried through the main branch of the optical fiber to the splitter, then through the tributary branches to the ONUs. Optical signals (light) from each ONU are carried through the respective tributary branch to the splitter, and then through the main branch to the OLT. Thus, streams of optical signals from the OLT to the ONUs, and from multiple ONUs to the OLT, use the same main branch of the optical fiber. A protocol such as time division multiple access (TDMA) can be used to distinguish one stream from another.

Single-mode optical fiber is usually used in a practical PON for its high bandwidth. In a single-mode optical fiber, only the fundamental mode can propagate for a long distance; other higher modes will leak and vanish quickly. In a typical implementation, a single-mode optical fiber is split into 64 single-mode tributary branches. Ideally, in such an implementation, 1/64 of the light (1/64 of the optical signal power) transmitted by an OLT would reach each ONU. In actuality, only about 1/100 of the optical signal power reaches each ONU because of signal attenuation along the transmission path, due to factors such as absorption, scattering, bends in the optical fiber, losses due to leaky modes, and losses at connectors and splices, for example. The direction from the OLT to the ONUs is usually referred to as the downstream direction.

Light coming in the other direction—the upstream direction, from the ONUs to the OLT—also suffers from similar power losses along the transmission path. Due to intrinsic features of waveguide coupling, most of the light in the fundamental mode in the single-mode tributary branches enters higher-order modes in the main branch and leaks quickly in the main branch. As a result, only about 1/100 of the optical signal power transmitted by an ONU reaches the OLT, resulting in very high insertion losses in the upstream direction.

Losses in the downstream direction are often acceptable, because most of the optical signal power is distributed to different ONUs and is utilized. What is more, downstream losses can be compensated for by placing an optical amplifier in the main branch, for example. However, losses in the upstream direction are problematic because most of the optical signal power just leaks and is wasted, and it is too expensive to place an optical amplifier in each tributary branch. Upstream losses can reduce bandwidth and reduce the transmission distance of the optical signals.

Accordingly, a solution that can reduce the upstream insertion losses at the splitter would be beneficial.

SUMMARY

In overview, in an embodiment according to the present disclosure, an optical splitter includes a waveguide main branch and a number of waveguide tributary branches. The main branch includes a light-absorptive core and a light-reflective grating. In an embodiment, the absorptive core is in the main branch and the grating is in the main branch between the absorptive core and the tributary branches. The absorptive core can absorb light that is arriving from the tributary branches and transmit light that is traveling from the main branch toward the reflective grating. The reflective grating can reflect light from the main branch back through the absorptive core to the main branch. Light arriving from the tributary branches exchanges mode with light reflected by the reflective grating.

In an embodiment, the light arriving from the direction of the main branch and reflected by the reflective grating has a wavelength of about 1311-1315 nano-meters. In an embodiment, light is also transmitted along the main branch toward the tributary branches at a second, different wavelength (e.g., about 1490 nano-meters). In an embodiment, the reflective grating is selectively reflective and transmits light at the second wavelength.

In an embodiment, the main branch includes a reflecting surface around its perimeter.

Embodiments according to the present disclosure provide a number of benefits and advantages. Because leaky light at the splitter is transformed into useful, guided light, upstream insertion losses at the splitter are reduced. In embodiments according to the present invention, up to 50 percent of the optical signal power from the ONUs reaches the OLT. Reducing power losses can increase bandwidth and increase the transmission distance of optical signals. Costs can be reduced because at least some of the additional equipment (e.g., amplifiers or regenerators) used to boost optical signal power can be eliminated.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1:
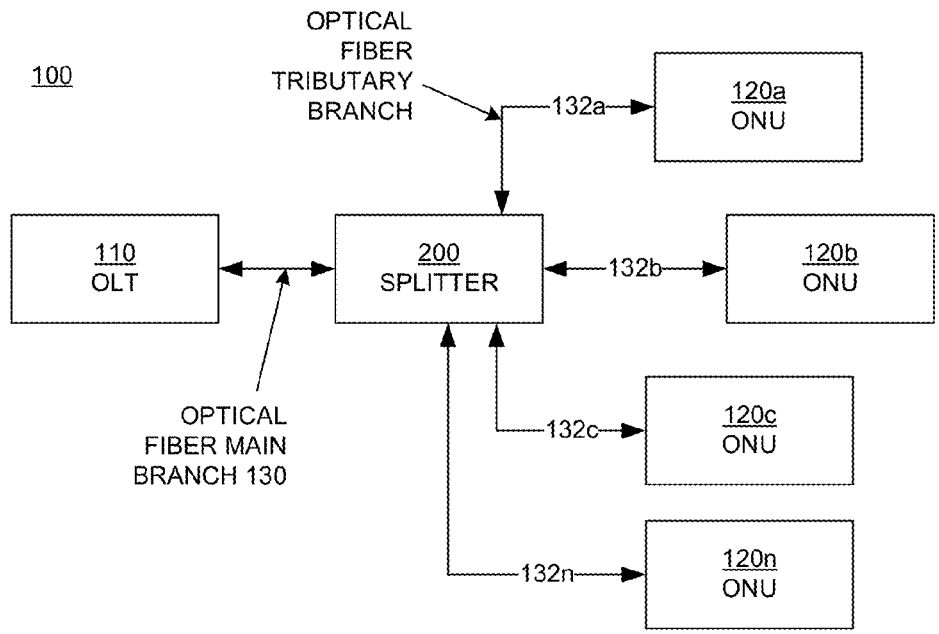
FIG. 1 is a block diagram illustrating selected components of an optical network including a splitter upon which embodiments according to the present invention can be implemented.

FIG. 1 is a block diagram illustrating selected components of an optical network 100 upon which embodiments according to the present invention can be implemented. In the example of FIG. 1, the network 100 includes an optical line terminal (OLT) 110 and a number of optical network units (ONUs) 120a, 120b, 120c, and 120n (120a-n) that are coupled by optical fibers as well as other network components (not shown). The ONUs 120a-n may also be known as optical network terminals (ONTs); in general, the term "ONT" is used to refer to a single-tenant ONU. There can be more than one OLT and more than one ONU per OLT.

In the example of FIG. 1, the optical fibers in the optical network 100 include a optical fiber main branch 130 and optical fiber tributary branches 132a, 132b, 132c, and 132n (132a-n). In an embodiment, the optical fiber main branch 130 and the optical fiber tributary branches 132a-n are single mode optical fibers. In an embodiment, the optical fiber main branch 130 and the optical fiber tributary branches 132a-n are coupled to a splitter 200. The splitter 200 is described in further detail in FIGS. 2A, 2B, 3A, and 3B.

With reference still to FIG. 1, in an embodiment, the network 100 is a passive optical network (PON) that does not require any active components to distribute optical signals carrying data between the OLT 110 and the ONUs 120a-n. Instead, passive optical components are used to distribute optical signals between the OLT 110 and the ONUs 120a-n.

The network 100 may be a Next Generation Access (NGA) system, such as a ten (10) gigabit-per-second (Gbps) GPON (XGPON), which may have a downstream bandwidth of about 10 Gbps and an upstream bandwidth of about 2.5 Gbps or more. Alternatively, the network 100 may be an Ethernet-based network, such as an EPON defined by the IEEE 802.3ah standard, a 10-Gigabit EPON as defined by the IEEE 802.3av standard, an asynchronous transfer mode PON (APON), a broadband PON (BPON) defined by the ITU-T G.983 standard, a GPON defined by the ITU-T G.984 standard, or a wavelength division multiplexed (WDM) PON (WPON).

The OLT 110 can be any device that is configured to communicate with the ONUs 120a-n and another part of the network 100 or with another network (not shown). For instance, the OLT 110 may forward data received from another part of the network 100 or from another network to the ONUs 120a-n, and forward data received from the ONUs 120a-n to other parts of the network 100 or to another network. The specific configuration of the OLT 110 may vary depending on the type of network. If the other network is using a network protocol, such as Synchronous Optical Networking/Synchronous Digital Hierarchy (SONET/SDH) or Ethernet, that is different from the protocol used in the network 100, the OLT 110 may include a converter that converts the other network protocol into the network 100 protocol. The OLT 110 converter may also convert the network 100 protocol into the other network protocol. The OLT 110 can be located at a centralized location, such as a central office, but may be at other locations as well.

The ONUs 120a-n can be any devices that are configured to communicate with the OLT 110. Specifically, the ONUs 120a-n may act as an intermediary between the OLT 110 and a customer. For instance, the ONUs 120a-n may forward data received from the OLT 110 to the customer, and forward data received from the customer to the OLT 110. The specific configuration of the ONUs 120a-n may vary depending on the type of network 100. In an embodiment, the ONUs 120a-n include an optical transmitter configured to send optical signals to the OLT 110, and an optical receiver configured to receive optical signals from the OLT 110. Additionally, the ONUs 120a-n may include a converter that converts the optical signals into electrical signals for the customer, such as signals in the Ethernet or asynchronous transfer mode (ATM) protocol, and a second transmitter and/or receiver that can send and/or receive the electrical signals to another customer device. The ONUs 120a-n can be located at distributed locations, such as customers' premises (e.g., at residences and/or business locations).

In an embodiment, the ONT 110 and ONUs 120a-n communicate via a data distribution system, which may include optical fibers, couplers, splitters (e.g., the splitter 200), distributors, and/or other equipment. In an embodiment, the optical fibers, couplers, splitters, distributors, and/or other equipment are passive optical components; that is, they do not require any power to distribute optical signals between the OLT 110 and the ONUs 120a-n. Alternatively, the network 100 may include active components, such as optical amplifiers.

At times, the term "downstream" may be used herein to indicate the direction from the OLT 110 toward the ONUs 120a-n, and the term "upstream" may be used herein to indicate the direction from the ONUs to the OLT. For example, optical signals flow downstream from the OLT 110 to the ONUs 120a-n, while optical signals from the ONUs flow upstream to the OLT.

In an embodiment, splitters (e.g., the splitter 200) are used in the network 100 to split an optical fiber (referred to herein as the optical fiber main branch) into multiple branches (referred to herein as optical fiber tributary branches).

Figure 2A:
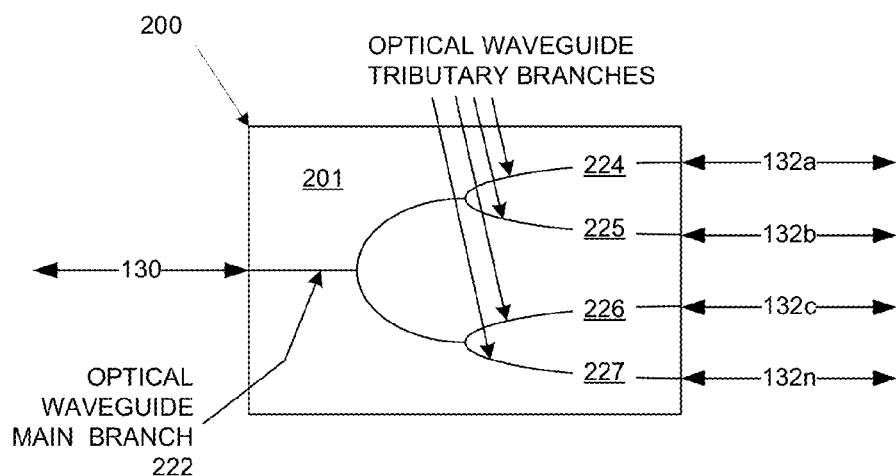
FIG. 2A illustrates a splitter in an embodiment according to the present invention.

FIG. 2A illustrates a splitter 200 in an embodiment according to the present invention. In an embodiment, the splitter 200 includes optical waveguides (e.g., silicon dioxide waveguides) formed on a substrate 201 (e.g., a silicon substrate). In such an embodiment, the splitter 200 includes an optical waveguide main branch 222 and a number of optical waveguide tributary branches 224, 225, 226, and 227 (224-227). There can be more or less than the four optical waveguide tributary branches shown in the figure; in an embodiment, there are 64 optical waveguide tributary branches. The optical waveguide main branch 222 is coupled to the optical fiber main branch 130, and the optical waveguide tributary branches 224-227 are each coupled to a respective one of the optical fiber tributary branches 132a-n.

Figure 2B:
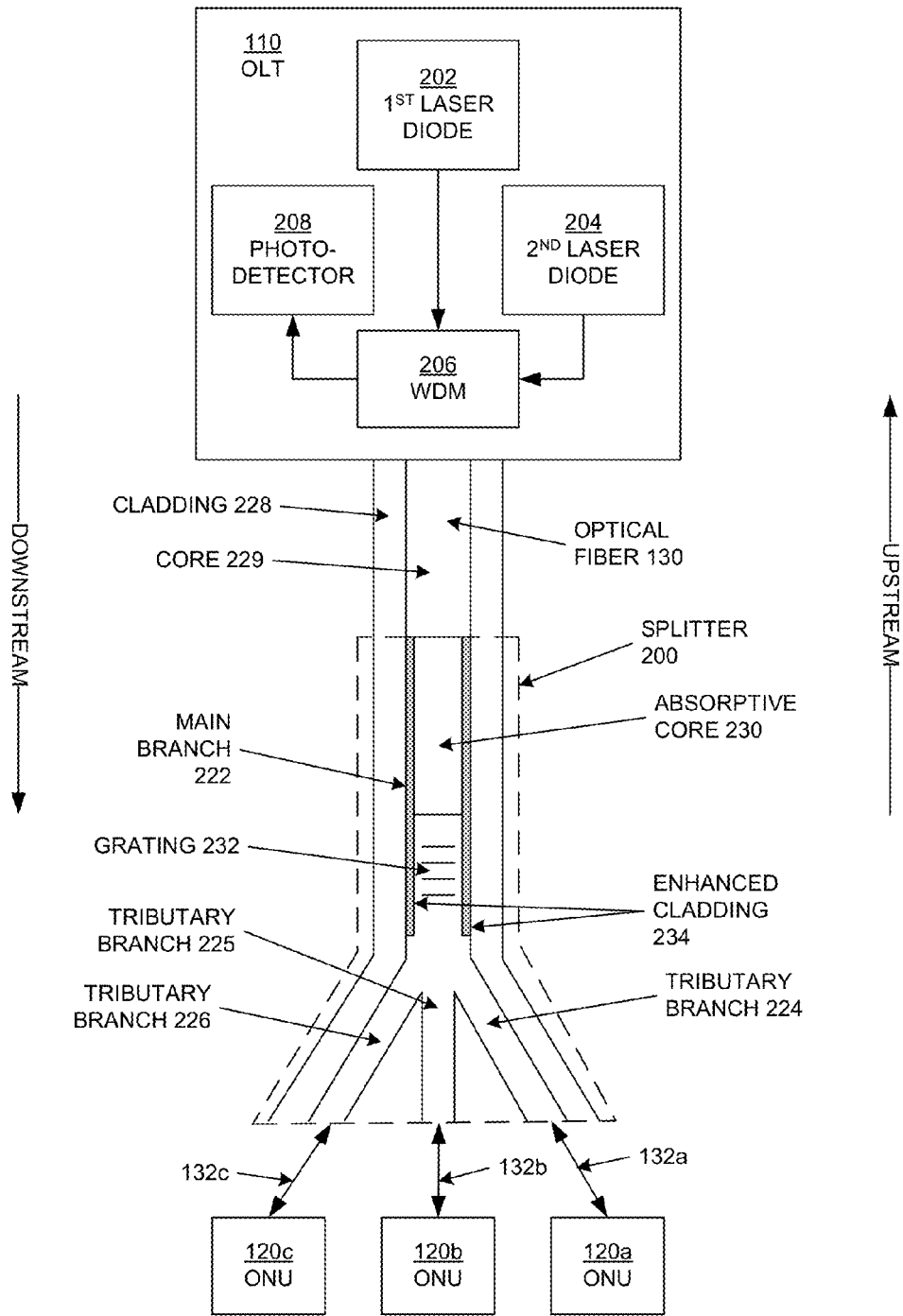
FIG. 2B is a block diagram showing selected components of an apparatus including a splitter coupled to an optical line terminal in an embodiment according to the present invention.

FIG. 2B is a block diagram showing an example of an apparatus including the splitter 200 that is coupled to the OLT 110 in an embodiment according to the present invention. In the example of FIG. 2B, the OLT 110 includes a first laser diode 202, a second laser diode 204, a wavelength division multiplexer (WDM) 206, and a photo-detector 208. The OLT 110 may include components other than those shown and described.

In an embodiment, the OLT 110 is an embedded optical time-domain reflectometer (EOTDR). The first laser diode 202, which may be referred to as a laser diode with upstream band, generates light (optical signals) at a wavelength of about 1311-1315 nano-meters (nm); this wavelength may be referred to herein as the first wavelength. The second laser diode 204, which may be referred to as a downstream laser diode, generates light (optical signals) at a wavelength of about 1490 nm; this wavelength may be referred to herein as the second wavelength.

The ONUs 120a, 120b, and 120c (120a-c) also generate light (optical signals), at a wavelength of about 1310 nm; this wavelength may be referred to herein as the third wavelength.

The term "about" is used herein to indicate that a wavelength not precisely equal to 1490 nm, or not precisely equal to 1310 or 1315 nm, may be permissible as long as the wavelength is within the tolerances that allow data to be accurately transmitted and received using optical signals sent over a network at that wavelength.

The photodetector 208 is used to detect incoming optical signals.

In the example of FIG. 2B, the OLT 110 is coupled via the optical fiber main branch 130 to an apparatus that may be referred to generally as a splitter. In the example of FIG. 2B, the splitter 200 includes an optical waveguide having a main branch 222 and a number of tributary branches 224, 225, and 226 (224-226). In an embodiment, the main branch 222 is between the OLT 110 and the tributary branches 224-226, and the tributary branches are between the main branch and the ONUs 120a-c. There can be more than three tributary branches. In an embodiment, there are 64 tributary branches.

Figure 3A:
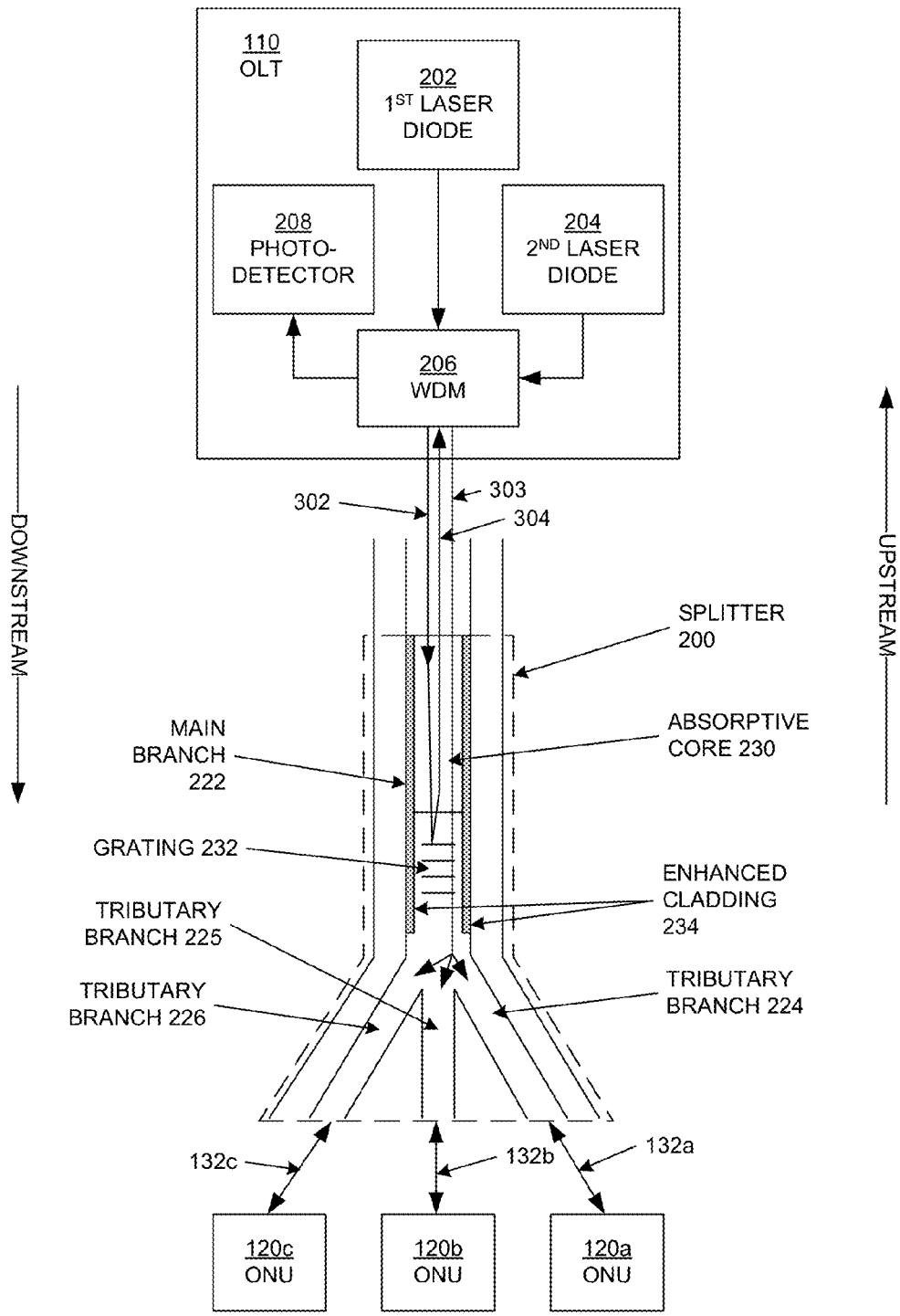
FIG. 3A is a block diagram illustrating an example of the apparatus in operation in an embodiment according to the present invention.
Figure 3B:
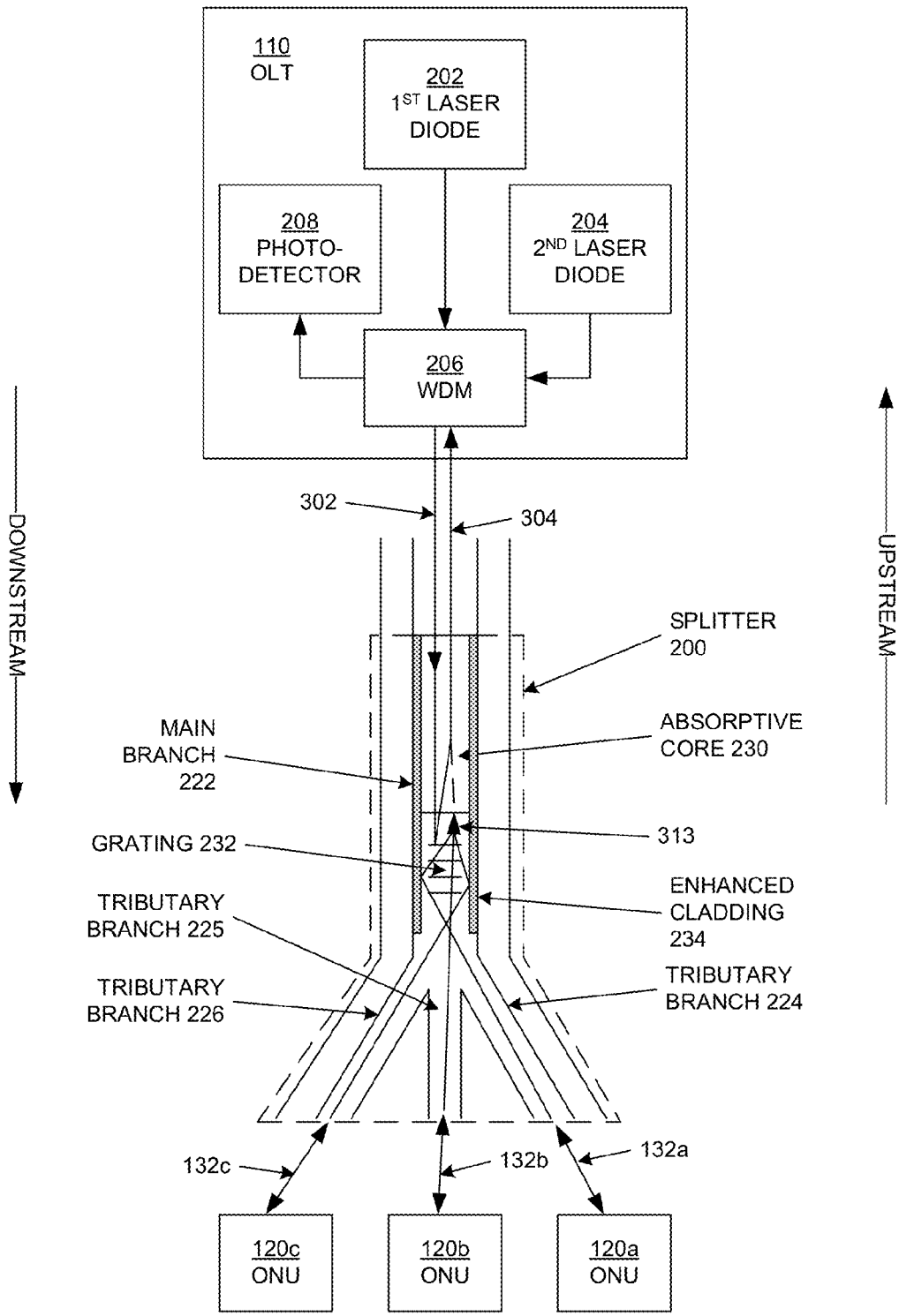
FIG. 3B is a block diagram illustrating another example of the apparatus in operation in an embodiment according to the present invention.

The optical fiber 130 includes a cladding 228 that surrounds a core 229; that is, the perimeter of the optical fiber is clad. In FIGS. 2B, 3A, and 3B, the optical fiber 130 and the splitter 200 are shown in cross-section.

A light-absorptive core 230 is included in the main branch 222, upstream of the tributary branches 224-226 (between the OLT 110 and the tributary branches). A light-reflective grating 232 is downstream of the absorptive core 230. In an embodiment, the grating 232 is in the main branch 222 between the absorptive core 230 and the tributary branches 224-226.

In an embodiment, a region of enhanced cladding 234 is included at the segment of the main branch 222 that is between the absorptive core 230 and the tributary branches 224-226. For example, the enhanced cladding 234 may include a light-reflecting surface that is located around the perimeter of the main branch 222. In an embodiment, the enhanced cladding 234 extends along the length of the absorptive core 230 and the grating 232.

In an embodiment, the grating 232 is selectively reflective. In such an embodiment, the grating 232 reflects light at a wavelength of about 1311-1315 nm (e.g., it reflects the light generated by the first laser diode 202) but does not reflect light at a wavelength of about 1490 nm (e.g., it does not reflect the light generated by the second laser diode 204). The grating 232 does not reflect light from the direction of the ONUs 120a-c, as the central wavelengths of the light from the ONUs and the light from the first laser diode 202 are separated.

The absorptive core 230 can include a material such as, but not limited to, a doped ion substrate, a quantum dot, and a semiconductor. The substrate may be, for example, glass, silica, or plastic. The absorptive core 230 has a key saturation property: it will absorb less optical power (light) if it is receiving stronger input optical power (light). The absorptive core 230 is also designed to absorb downstream light having the first wavelength (from the first laser diode 202) and upstream light having the third wavelength (arriving from the tributary branches 224-226), and to transmit downstream light having the second wavelength (from the second laser diode 204). In the absence of upstream light having the third wavelength, the absorptive core 230 will absorb the downstream light having the first wavelength. In the presence of upstream light having the third wavelength (arriving from the tributary branches 224-226), the absorptive core 230 will absorb the upstream light having the third wavelength and so will absorb less downstream light having the first wavelength. The amount of downstream light having the first wavelength that would be absorbed by the absorptive core 230 decreases as the amount of upstream light having the third wavelength increases. Thus, in the presence of upstream light having the third wavelength (arriving from the tributary branches 224-226), more of the downstream light having the first wavelength will pass through the absorptive core 230 to the reflective grating 232, which will reflect that downstream light back toward the OLT 110.

In operation, the absorptive core 230 can absorb light from the first laser diode 202. The amount of light from the first laser diode 202 that is absorbed by the absorptive core 230 depends on whether or not there is light from the direction of the tributary branches 224-226. In the presence of light from the direction of (away from) the tributary branches/ONUs (in the presence of upstream light), the absorptive core 230 will absorb the upstream light, in which case most if not all of the downstream light from the direction of the OLT 110 (specifically, the light from the first laser diode 202, as well as the light from the second laser diode 204) will pass through the absorptive core to the grating 232. The light from the first laser diode 202 will be reflected back through the grating 232 to the OLT 110, while the light from the second laser diode 204 will not be reflected by the grating.

FIG. 3A is a block diagram illustrating an example of the apparatus including the splitter 200 in operation in an embodiment according to the present invention. In the FIG. 3A example, light 302 at a first wavelength (specifically, light from the first laser diode 202) is transmitted from the OLT 110 through the optical fiber main branch 130 into the optical waveguide main branch 222 and the absorptive core 230. Also, light 303 at a second wavelength (specifically, light from the second laser diode 204) may also be transmitted from the OLT 110 through the optical fiber main branch 130 into the optical waveguide main branch 222 and the absorptive core 230. However, in this example, light is not being received from the direction of the tributary branches 224-226 (e.g., from the ONUs 120a-c).

In the absence of light from the direction of the tributary branches 224-226 (e.g., from the ONUs 120a-c), the absorptive core 230 will absorb most if not all of the light 302 generated by the first laser diode 202 (the light at the first wavelength). The light that is not absorbed by the absorptive core 230 will be reflected by the grating 232, back toward the OLT 110; this is the reflected light 304. The reflected light 304 is in the fundamental, non-leaky mode. As mentioned above, the grating 232 will not reflect the light 303 generated by the second laser diode 204 (the light at the second wavelength).

FIG. 3B is a block diagram illustrating another example of the apparatus including the splitter 200 in operation in an embodiment according to the present invention. In the FIG. 3B example, light 302 at a first wavelength (specifically, light from the first laser diode 202) is transmitted from the OLT 110 through the optical fiber main branch 130 into the optical waveguide main branch 222 and the absorptive core 230. Also, light 303 at a second wavelength (specifically, light from the second laser diode 204) (not shown in FIG. 3B) may also be transmitted from the OLT 110 through the optical fiber main branch 130 into the optical waveguide main branch 222 and the absorptive core 230. Furthermore, upstream light 313 is also being received from the direction of the tributary branches 224-226 (e.g., from the ONUs 120a-c).

As the upstream light 313 exits the tributary branches 224-226, some of it will be coupled to higher-order modes as shown in FIG. 3B. Some or all of the higher-order mode light is reflected by the enhanced cladding 234. In essence, modes of the light 313 that would have leaked in the absence of the enhanced cladding 234 are confined to the main branch 222 and absorbed by the absorptive core 230. The absorptive core 230 also absorbs the portion of the light 313 that stays in the fundamental mode (the portion of the light that did not enter a higher-order mode).

Because the absorptive core 230 absorbs the upstream light 313 (light from the direction of the tributary branches 224-226, e.g., from the ONUs 120a-c), it will absorb less of the downstream light 302 generated by the first laser diode 202 (the downstream light having the first wavelength). The light 304 from the first laser diode 202 that is not absorbed by the absorptive core 230 will be reflected by the grating 232, back toward the OLT 110. As mentioned above, the grating 232 will not reflect the light 303 generated by the second laser diode 204 (the light at the second wavelength).

The amount of downstream light 302 having the first wavelength that is absorbed by the absorptive core 230 may be greatly reduced relative to the example of FIG. 3A, depending on the amount of upstream light 313 being received, and so the amount of light 304 that is reflected may be greatly increased relative to the example of FIG. 3A. The reflected light 304 is in the fundamental, non-leaky mode.

Continuing with reference to FIG. 3B, the upstream light 313 (from the direction of the tributary branches/ONUs) exchanges its modes with the fundamental, non-leaky mode of the reflected light 304. Specifically, the modes of the upstream light 313 that would have leaked (the higher-order modes) are confined locally by the enhanced cladding 234 and absorbed by the absorptive core 230, and exchanged with (coupled into) the fundamental, non-leaky mode of the reflected light 304. Data encoded into the upstream light 313 is also exchanged into the reflected light 304 as part of the mode exchange.

More specifically, the upstream light 313 is in the fundamental mode inside the tributary branches 224-226 before it reaches the main branch 222. The enhanced cladding 234 prevents the higher-order modes of the upstream light 313 from leaking quickly and the higher-order modes are instead absorbed by the absorptive core 230. In the presence of the upstream light 313, the absorptive core 230 absorbs much less of the downstream light 302 (which is in the fundamental mode); thus, a significant portion of the downstream light 302 passes through the absorptive core to the reflective grating 232 and is reflected back toward the OLT 110 through the absorptive core. The reflected light 304 is also in the fundamental mode. A mode exchange between the upstream light 313 and the light 304 reflected by the grating 232 occurs in the absorptive core 230. Inside the absorptive core 230, the energy of the higher-order of the upstream light 313 is transformed to the energy of the reflected light 304, which is in the fundamental mode.

In essence, leaky light at the splitter 200 is transformed into useful, guided light. Consequently, upstream insertion losses at the splitter are reduced. Conventionally, only about one percent of the optical signal power from the ONUs 120a-c reaches the OLT 110. In embodiments according to the present invention, up to 50 percent of the optical signal power from the ONUs reaches the OLT. Reducing power losses can increase bandwidth and increase the transmission distance of optical signals. Costs can be reduced because at least some of the additional equipment (e.g., amplifiers or regenerators) used to boost optical signal power can be eliminated.

Figure 4:
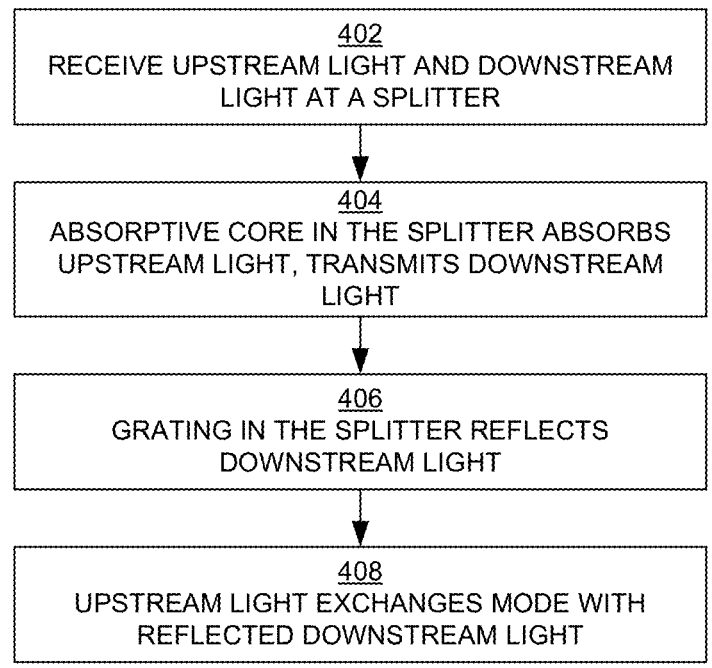
FIG. 4 is a flowchart of an example of a method for reducing upstream insertion losses at a splitter in an embodiment according to the present invention.

FIG. 4 is a flowchart 400 of an example of a method for reducing upstream insertion losses at a splitter in an embodiment according to the present invention. FIG. 4 is discussed with reference to the other figures above.

In block 402, light transmitted along the optical fibers 130 and 132a-n between an OLT 110 and multiple ONUs 120a-c is received at the splitter 200. The light includes downstream light 302 having a first wavelength and arriving from the direction of the OLT (the downstream light 302 is traveling away from the OLT) into the main branch 222, downstream light 303 having a second wavelength and arriving from the direction of the OLT (the downstream light 303 is traveling away from the OLT) into the main branch 222, and upstream light 313 having a third wavelength and arriving from the direction of the ONUs (the upstream light 313 is traveling away from the ONUs) into at least one of the tributary branches 224-226. In an embodiment, the first wavelength is about 1311-1315 nm, the second wavelength is about 1490 nm, and the third wavelength is also about 1310 nm. The downstream light 302 is in the non-leaky, fundamental mode.

In block 404, the upstream light 313 having the third wavelength is absorbed (e.g., by the absorptive core 230), but some or all of the downstream light 302 having the first wavelength is not absorbed. That is, in the presence of the upstream light 313, the upstream light will be absorbed by the absorptive core 230 while some or all of the downstream light 302 having the first wavelength is not absorbed by the absorptive core and instead is transmitted through the absorptive core to the grating 232. Also, as mentioned above, the absorptive core 230 by design does not absorb the downstream light 303 that has the second wavelength.

In block 406, the downstream light 302 having the first wavelength and that was not absorbed by the absorptive core 230 is reflected (e.g., by the grating 232) back through the absorptive core toward the OLT 110; this light is the reflected light 304.

In block 408, the light 313 having the third wavelength exchanges mode with the reflected light 304 (the light having the first wavelength that is being reflected back through the absorptive core toward the OLT). That is, the light 313 exchanges its leaky mode(s) with the non-leaky mode of the reflected light 304. The mode exchange occurs in the absorptive core 230.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware. In addition, any disclosure of components contained within other components should be considered as examples because many other architectures can be implemented to achieve the same functionality.

The process parameters and sequence of steps described and/or illustrated herein (e.g., in FIG. 4) are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Embodiments according to the invention are thus described. While the present disclosure has been described in particular embodiments, it should be appreciated that the invention should not be construed as limited by such embodiments, but rather construed according to the below claims.

What is claimed is:

1. An apparatus, comprising:
an optical waveguide having a main branch and a plurality of tributary branches coupled to the main branch, wherein the main branch includes:
a light-absorptive core; and
a light-reflective grating with the light-reflective grating located between the light-absorptive core and the tributary branches, the light-absorptive core having properties that cause it to absorb light arriving from the tributary branches, the light-reflective grating having properties that cause it to reflect light from the main branch back through the light-absorptive core to the main branch, wherein the light arriving from the tributary branches exchanges mode with light reflected by the light-reflective grating.

2. The apparatus of claim 1, wherein the light reflected by the light-reflective grating is in a fundamental mode.

3. The apparatus of claim 1, wherein the light from the main branch and reflected by the light-reflective grating has a first wavelength of about 1311-1315 nanometers (nm).

4. The apparatus of claim 3, wherein light is also transmitted along the main branch toward the tributary branches at a second wavelength.

5. The apparatus of claim 4, wherein the second wavelength is about 1490 nanometers (nm).

6. The apparatus of claim 4, wherein the light-reflective grating is selectively reflective and transmits light at the second wavelength.

7. The apparatus of claim 1, wherein the light-absorptive core comprises a material selected from the group of: doped ion substrate, quantum dot, and a semiconductor.

8. The apparatus of claim 1, wherein the main branch comprises a light-reflecting surface around its perimeter between the light-absorptive core and the tributary branches.

9. A system in an optical network, comprising:
an optical line terminal (OLT);
a plurality of optical network units (ONUs); and
an optical splitter coupled between the optical line terminal (OLT) and the plurality of optical network units (ONUs), wherein the optical splitter includes a main branch and a plurality of tributary branches coupled to the main branch, wherein the main branch includes a light-absorptive core and a light-reflective grating with the light-reflective grating located between the light-absorptive core and the tributary branches, wherein the light-absorptive core absorbs light traveling in a direction away from the ONUs and transmits light with a first wavelength traveling in a direction away from the OLT, wherein the light with the first wavelength traveling away from the OLT that reaches the light-reflective grating and is then reflected by the light-reflective grating back through the light-absorptive core in a direction toward the OLT, and wherein the light traveling in the direction away from the ONUs exchanges mode in the light-absorptive core with the light having the first wavelength that is reflected by the light-reflective grating back through the light-absorptive core toward the OLT.

10. The system of claim 9, wherein the light reflected back toward the OLT is in a fundamental, non-leaky mode.

11. The system of claim 9, wherein the first wavelength is about 1311-1315 nanometers (nm).

12. The system of claim 11, wherein light having a second wavelength is transmitted in the direction away from the OLT.

13. The system of claim 12, wherein the second wavelength is about 1490 nanometers (nm).

14. The system of claim 12, wherein the light-reflective grating is selectively reflective and transmits the light having the second wavelength.

15. The system of claim 9, wherein the light-absorptive core comprises a material selected from the group of: doped ion substrate, quantum dot, and a semiconductor.

16. The system of claim 9, wherein the main branch comprises a reflecting surface around its perimeter at the light-absorptive core and the light-reflective grating.

17. A method implemented in an optical splitter having a main branch and a plurality of tributary branches coupled to the main branch, the method comprising:
receiving light having a first wavelength into the main branch of the optical splitter, light having a second wavelength into the main branch, and light having a third wavelength into one of the plurality of tributary branches of the optical splitter, wherein the main branch of the optical splitter includes a light-absorptive core and a light-reflective grating with the light-reflective grating located between the light-absorptive core and the plurality of tributary branches;
absorbing, with the light-absorptive core in the main branch of the optical splitter, the light having the third wavelength;
transmitting the light having the first wavelength and the light having the second wavelength from the main branch through the light-absorptive core to the light-reflective grating; and
reflecting, with the light-reflective grating in the main branch of the optical splitter, the light having the first wavelength back toward the light-absorptive core, wherein the light having the third wavelength exchanges mode with the light having the first wavelength that is reflected back to the light-absorptive core.

18. The method of claim 17, wherein the light having the first wavelength that is reflected back to the light-absorptive core is in a fundamental mode.

19. The method of claim 17, wherein the first wavelength is about 1311-1315 nanometers (nm), the second wavelength is about 1490 nm, and the third wavelength is about 1310 nm.

20. The method of claim 17, wherein the light-reflective grating is selectively reflective and transmits the light at the second wavelength but reflects the light at the first wavelength, and wherein the light-absorptive core comprises a material selected from the group of: doped ion, quantum dot, and semiconductor.

* * * * *